United States Patent Office 3,523,419
Patented Aug. 11, 1970

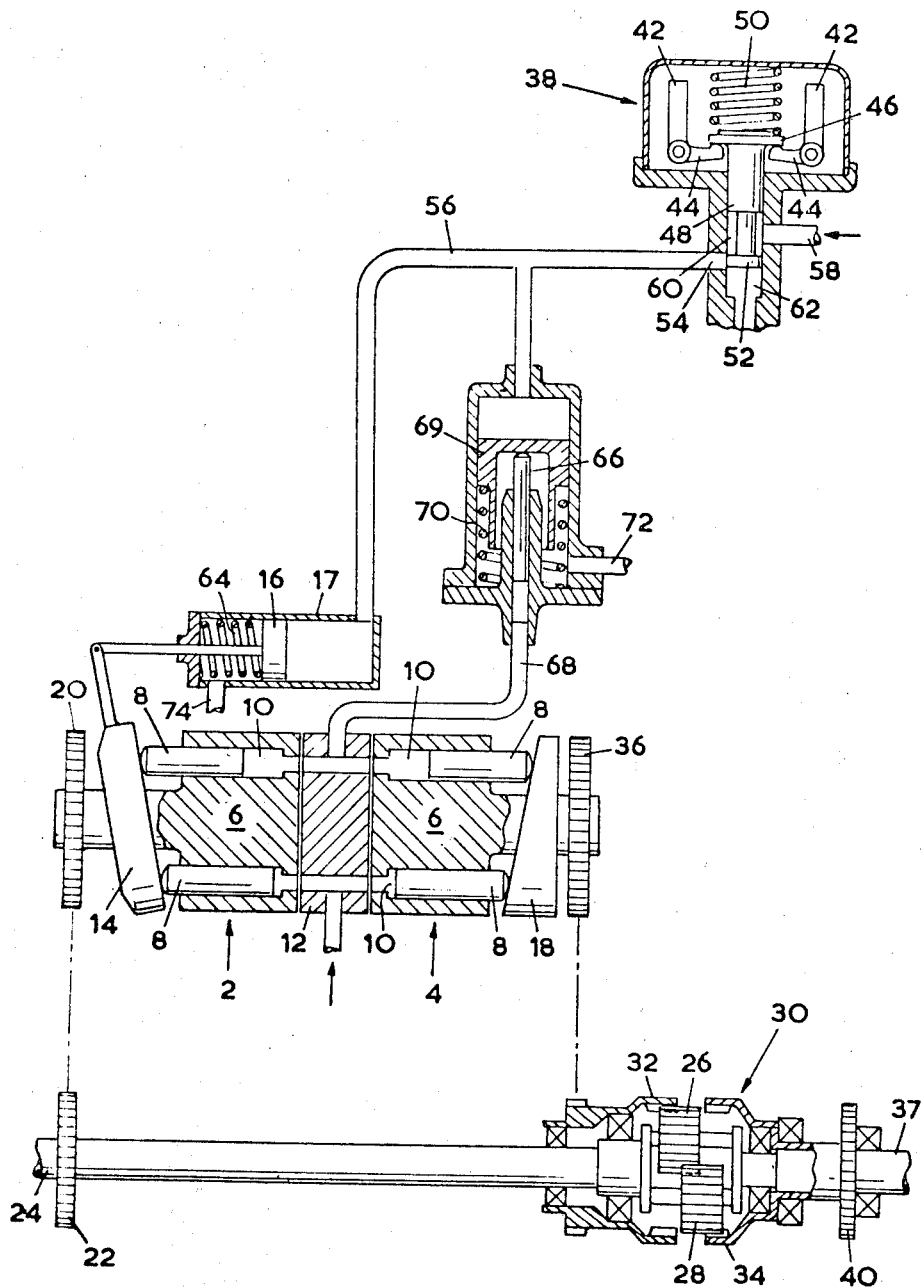

3,523,419
HYDRAULICALLY CONTROLLED ROTARY TRANSMISSIONS
John Anthony Hindle, Leeds, England, assignor to Sundstrand Corporation, a corporation of Delaware
Filed June 27, 1968, Ser. No. 740,750
Claims priority, application Great Britain, June 27, 1967, 29,538/67
Int. Cl. F15b 15/18
U.S. Cl. 60—53        11 Claims

ABSTRACT OF THE DISCLOSURE

A constant speed drive comprising a variable displacement hydraulic pump adapted to be driven at variable speed, a hydraulic motor driven by fluid supplied by the pump, means for varying the displacement of the pump to vary the speed of the motor relative to the speed of the pump, means for sensing the motor speed and controlling the displacement varying means to maintain a constant motor speed, and means for sensing the pressure of fluid in the hydraulic circuit connecting the pump and motor as indicative of the load on the drive for controlling the displacement varying means to handle the load in a manner to maintain the motor speed constant.

---

One form of transmission through which an aircraft generator is driven by the engine of the aircraft involves the use of two swashplate units of which one serves basically as a pump and the other serves basically as a hydraulic motor driven by the pump unit, with control so arranged that the speed ratio of the pump and motor unit varies automatically so as to maintain a substantially constant drive speed for the generator, regardless of the aircraft engine speed. This control is possible by virtue of one of the swashplate units, preferably that which serves basically as a pump, having a swashplate which is variable as to its angle of inclination to a plane at right angles to the axis of rotation.

This invention is concerned particularly with improving the sensitivity of the control system of a constant speed transmission based on swashplate units, but it is also applicable to other forms of hydraulic pump and motor transmissions in which an increased load on the transmission tending to reduce the output speed is reflected by an increase in the pressure of working fluid in the system, and vice versa.

According to this invention the working fluid supplied by the pump to drive the motor acts on a load-sensitive piston which, when the load increases so as to increase working fluid pressure, moves so as to alter the speed control system of the transmission (for example, the angle of the variable-angle swashplate) in the sense tending to increase output speed of the transmission, and vice versa.

In addition a constant speed transmission according to this invention has the usual governor arrangement to control the speed ratio of the transmission in accordance with the output speed. The load-sensitive piston according to this invention does not fulfill the function of the governor but serves as an advance control increasing the speed at which the transmission reacts to a change in output load.

An example of a transmission according to this invention is shown in the accompanying drawing which shows a diagrammatic layout of the transmission.

The transmission shown forms part of a constant-speed drive for an aircraft alternator (not shown). The transmission includes two swashplate units 2 and 4 of which the unit 2 serves as a pump while the unit 4 serves as a hydraulic motor powered by pressurized fluid delivered by the unit 2. Each swashplate unit includes a cylinder barrel 6 containing a number of pistons 8 in cylinder 10 which communicate with a stationary valve plate member 12. The pistons of the pump unit 2 bear on a swashplate 14 which is adjustable as to its angle of inclination to a plane at right angles to the axis of rotation of the cylinder barrel. The pivot axis of the swashplate 14 (not shown) passes through the axis of rotation, as is usual. Movement about this pivot axis is controlled by a control piston 16 in a cylinder 17. The pistons 8 of the motor unit, on the other hand, bear on a fixed swashplate 18.

In use the cylinder barrel of the pump unit 2 is driven via gears 20 and 22 by a transmission input shaft 24 which is driven by the aircraft engine (not shown). The input shaft 24 also drives two intermeshing planetary gears 26 and 28 of a differential 30. The differential also includes annular gears 32 and 34 which mesh respectively with the planetary gears 26 and 28. The annular gear 32 is driven via a gear wheel 36 on the motor unit 4, while the annular gear 34 is connected to a shaft 37 which is the output shaft of the transmission as a whole. With this arrangement only part of the power is transmitted via the pump and motor unit.

By varying the angle of inclination of the swashplate 14, the output speed of the motor unit 4 can be varied, and also the output speed of the transmission as a whole. A governor 38 driven by a gear 40 on the shaft 37 (in a manner not shown) controls the position of the control piston 16 so as to maintain a constant speed of the shaft 37 regardless of the input speed of the shaft 24. The governor is in a conventional form and includes pivoted weights 42 which are pivoted on pins 45 and are rotated bodily about the axis of the governor so that inwardly directed finger portions 44 on the weights bear upwards on a flange 46 of a piston valve 48, against the action of a spring 50, with a force which increases with increasing rotational speed owing to the centrifugal forces on the weights. When the transmission output speed is at the desired value, a land portion 52 of the piston valve is aligned with a port 54 connected to a pipe 56 leading to the cylinder 17 of the control piston 16.

Pressurized hydraulic fluid, for example at about 300–350 p.s.i., is delivered to a governor inlet pipe 58 leading to an annular chamber 60. While the governor is rotating at the desired control speed, there is no significant flow of fluid from the chamber 60 to the pipe 56 because of the position of the land portion 52 of the valve, though the land portion is slightly narrower than the port 54 so as to allow a slight continuous flow into the pipe 56 to make up for fluid lost from the cylinder 17 by leakage. The control pressure in the pipe 56 and cylinder 17 may, for example, have a mean value of about 100 p.s.i.

When the governor speed increases above the desired value, by virtue of a rise in the speed of the shaft 24, the weights push the piston valve 52 upwardly so as to permit the port 54 to communicate with a drain space 62 below the piston valve so that fluid pressure in the cylinder 17 falls and therefore permits a spring 64 to move the piston 16 to the right, thus reducing the angle of the swashplate 14; consequently the output flow from the pump unit 2 decreases and results in a decreased speed of the motor unit 4 and consequently of the output shaft 37, thus returning the governor to its initial position in which the land portion 52 is again similarly aligned with the port 54. In the event of a decrease in the governor speed, the converse occurs; that is to say, the piston valve 48 is lowered by the governor spring 50 so as to permit fluid from the annular chamber 60 to flow more freely into the port 54 and thus increase the pressure in the cylinder 17 with the result that the swashplate angle is increased and thus increases the speed of the motor unit 4 and restores the speed of the output shaft 40 and governor to its former desired value.

In accordance with the present invention, the transmission includes a load-sensitive piston 66 which is subjected to the pressure of working fluid between the pump and motor, by virtue of a pipe 68 connected to the valve plate 12. The working fluid is the fluid which is delivered by the pump unit 2 to drive the motor unit 4; the working fluid pressure may, for example, be about 3000 p.s.i. at full load. When the load on the motor unit rises, the pressure of the working fluid in the pipe 68 rises. As a result, the piston 66 is urged upwardly with a greater force and displaces upwardly an intermediate piston 69 (with the assistance of a spring 70), thus increasing the control pressure in the pipe 56. As a result the piston 16 moves further to the left so as to increase the swashplate angle thus tending to increase the motor speed so as to counteract the drop in the motor speed caused by the increase in load. In other words, the load-sensitive piston 66 senses an increase in the load on the motor unit 4 and, in anticipation of the inevitable short-term drop in motor speed (i.e. before the drop is corrected by the governor), increases the fluid output of the pump unit 2 so as largely to override the short-term drop in motor speed which would otherwise occur before the governor could respond. Conversely, the moment the load on the motor decreases, the load-sensitive piston 66 senses the decrease in working fluid pressure and permits the piston 16 to move to the right; this decreases the pump output and therefor tend to decrease the motor speed and substantially override the short-term rise in motor-unit speed which would otherwise occur. The fall or rise in motor-unit speed which would otherwise occur. The fall or rise in motor-unit speed which would occur in the absence of the load-sensitive piston after an abrupt increase or decrease in load is only for the short period before the governor comes into effect, but for some purposes it is desirable to minimize even a short-term rise or fall in an aircraft generator speed, for example where the aircraft includes sensitive equipment which depends on a precisely controlled generator speed to provide constant-frequency power supply.

Any fluid leaking into the space below the piston 69 or to the left of the piston 16 is conducted away by a drain pipe 72 or 74.

A supply of working fluid is delivered to the valve plate 12 from a suitable pump (not shown) through a pipe 76.

I claim:

1. A constant speed transmission including a hydraulic pump and a hydraulic motor driven by working fluid supplied by the pump, with a speed control system including a governor to maintain a substantially constant transmission output speed, regardless of the input speed, characterized by a load-sensitive piston which is acted upon by working fluid and is arranged to move under the influence of the working fluid to alter the speed control system so that an increase or decrease in the load on the transmission tending to reduced or increase the output speed of the transmission, as the case may be, causes the load-sensitive piston to move, under the influence of the increased or decreased working fluid pressure, to counteract the change in output speed.

2. A transmission according to claim 1 in which the pump and motor units are swashplate units of which the pump swashplate is of adjustable inclination, being controlled by a piston subject to a control pressure which is set basically by the governor, the control pressure being increased to increase the pump output and vice versa, the action of the load-sensitive piston being to increase the control pressure on feeling an increase in the working fluid pressure, and vice versa.

3. A transmission according to claim 2 in which the load-sensitive piston acts by bearing against an intermediate piston of larger diameter than the load-sensitive piston, which intermediate piston acts on the control fluid.

4. A transmission according to claim 3 in which the intermediate piston is urged by a spring in the direction tending to increase the control fluid pressure.

5. A transmission according to claim 1 including a differential gear having two inputs driven respectively by the transmission input shaft and by the hydraulic motor, and an output which is the output of the transmission and which drives the governor.

6. In a controlled speed transmission including a hydraulic pump unit adapted to be driven by a variable speed prime mover, a hydraulic motor unit connected in circuit with the pump unit so that the motor unit is driven by fluid supplied from the pump unit, an output shaft driven by said motor unit, means for varying the displacement of one of the hydraulic units, means for sensing the speed of the output shaft and means responsive to the speed sensing means controlling the displacement varying means to maintain the speed of the output shaft regardless of variations in the speed of the pump unit, the improvement comprising means for sensing the pressure of working fluid in said circuit indicative of variatons in the load on the motor unit, and means responsve to the pressure sensing means controlling the displacement varying means to maintain the speed of the motor unit regardless of variations in load thereon.

7. In a constant speed transmisison including an axial piston swashplate pump adapted to be driven by a variable speed prime mover, a rotary hydraulic motor connected in circuit with the pump so that the motor is driven by fluid supplied from the pump, a piston and cylinder device for varying the angle of the pump swashplate to vary the displacement of the pump thereby to vary the speed of the motor relative to the pump, governor means for sensing the output speed of the motor, and valve means responsive to the governor means and controlling th flow of control fluid under pressure relative to the displacement varying piston and cylinder device to maintain the speed of the motor constant regardless of variations in the speed of the pump, the improvement comprising a differential piston and cylinder device having one end communicating with the circuit connecting the pump and motor to sense the pressure of working fluid in the circuit indicative of variations in the load on the motor, and an opposite end adapted to vary the pressure of control fluid in the displacement varying piston and cylinder device responsive to variations in working pressure thereby to maintain the speed of the motor constant regardless of variations in load thereon.

8. A constant speed transmisison including a hydraulic pump and a hydraulic motor driven by working fluid supplied by the pump, with a speed control system to maintain a substantially constant transmission output speed, regardles sof the input speed including a load-sensitive piston responsive to working fluid and constructed to alter the speed control system so that an increase or decrease in the load on the transmission tending to reduce or increase the output speed of the transmission causes the load-sensitive piston to move to counteract the change in output speed, and output speed responsive governor for controlling the speed control system to maintain a substantially constant output speed.

9. A transmisison according to claim 8 in which the pump and motor units are swashplate units, the pump having a swashplate of adjustable inclination, said swashplate beng controlled by a control piston, said control piston being basically controlled by the speed responsive governor, said speed responsive governor increasing control fluid pressure to the control piston to increase the pump output and vice versa, said load-sensitive piston being connected to increase the control pressure responsive to an increase in the working fluid pressure, and vice versa.

10. A transmission according to claim 9 including an intedmediate piston of larger diameter than the load-sensitive piston and acting against the latter, said intermediate piston acting on the control fluid.

11. A transmission according to claim 10 including a spring urging the intermediate piston in a direction tending to increase the control fluid pressure.

References Cited

UNITED STATES PATENTS

| | | |
|---|---|---|
| 2,026,776 | 1/1936 | Douglass. |
| 2,238,061 | 4/1941 | Kendrick. |
| 2,472,477 | 6/1949 | Harrington et al. |
| 2,803,112 | 8/1957 | Sadler et al. |
| 2,888,806 | 6/1959 | Teumer. |

EDGAR W. GEOGHEGAN, Primary Examiner